No. 852,384. PATENTED APR. 30, 1907.
J. W. HALL.
FLUID-PRESSURE POWER TRANSMISSION MECHANISM.
APPLICATION FILED OCT. 24, 1905.
3 SHEETS—SHEET 2.
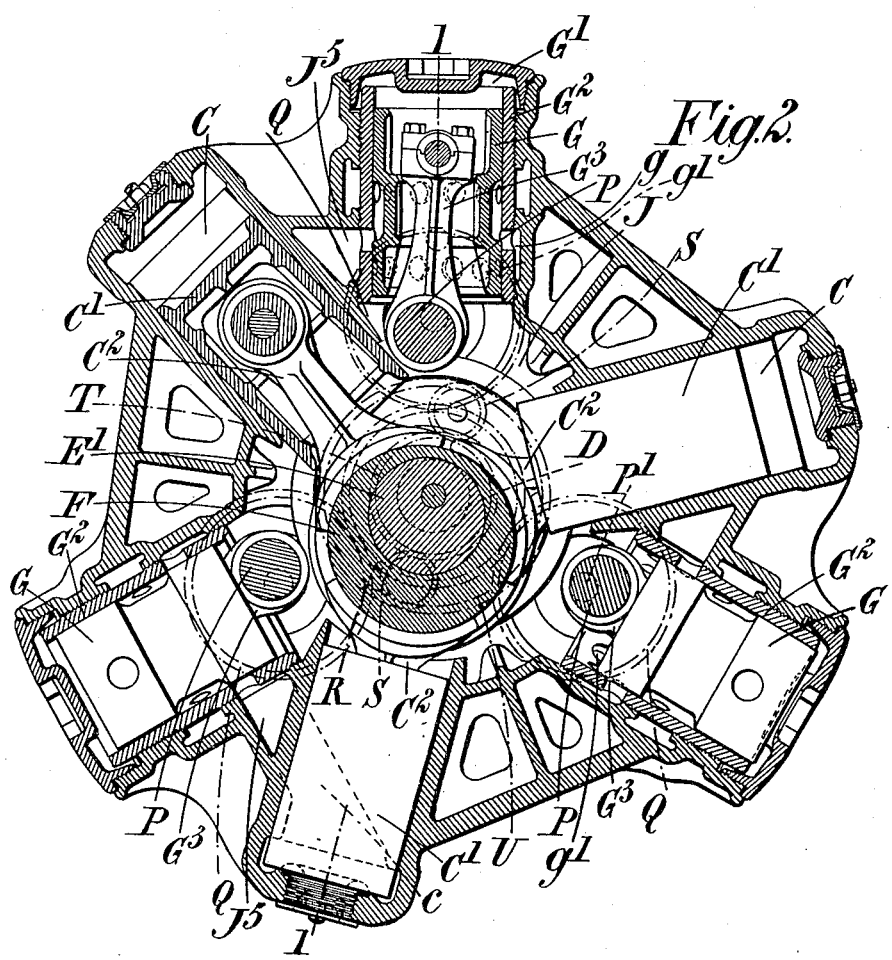

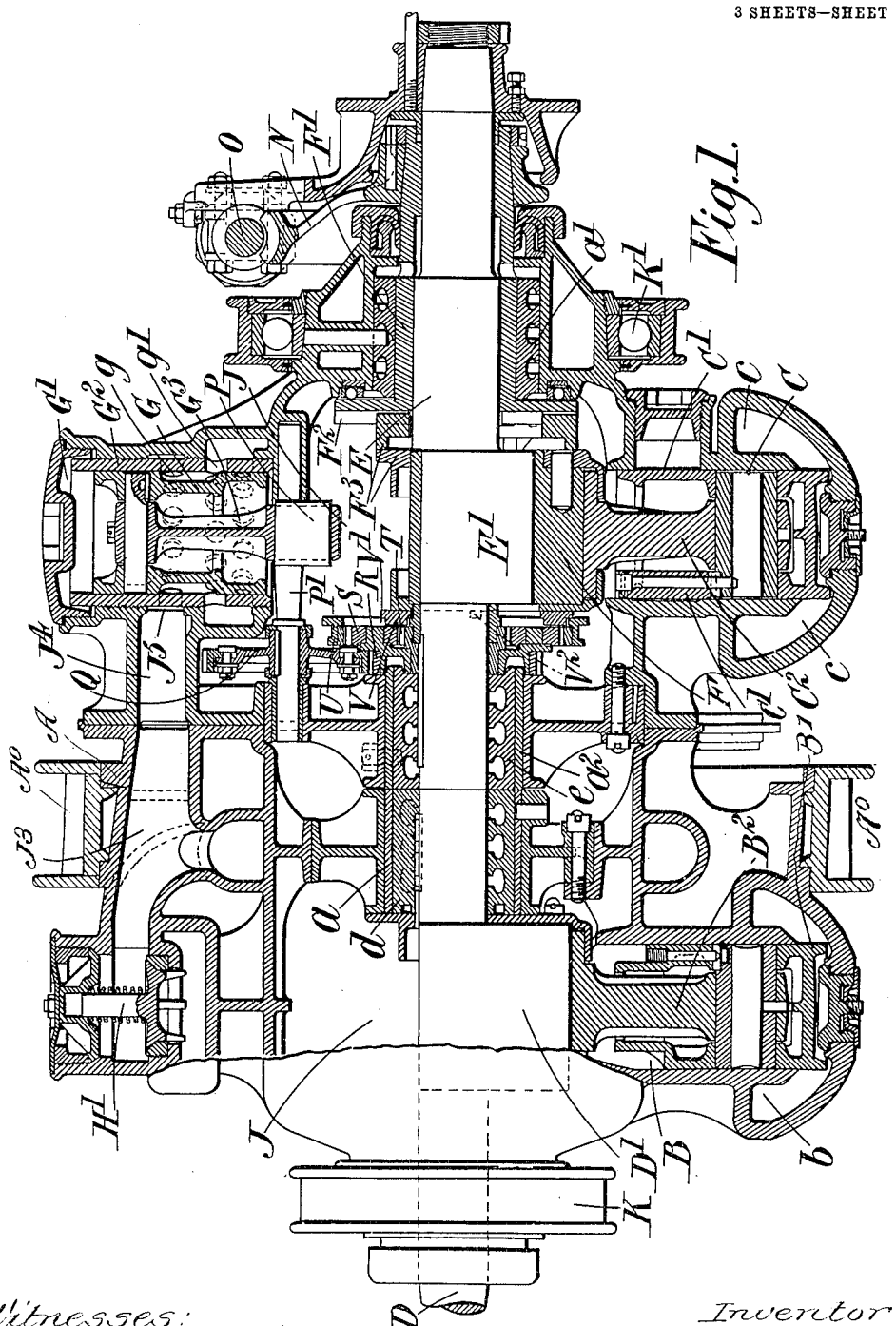

No. 852,384. PATENTED APR. 30, 1907.
J. W. HALL.
FLUID PRESSURE POWER TRANSMISSION MECHANISM.
APPLICATION FILED OCT. 24, 1905.
3 SHEETS—SHEET 3.
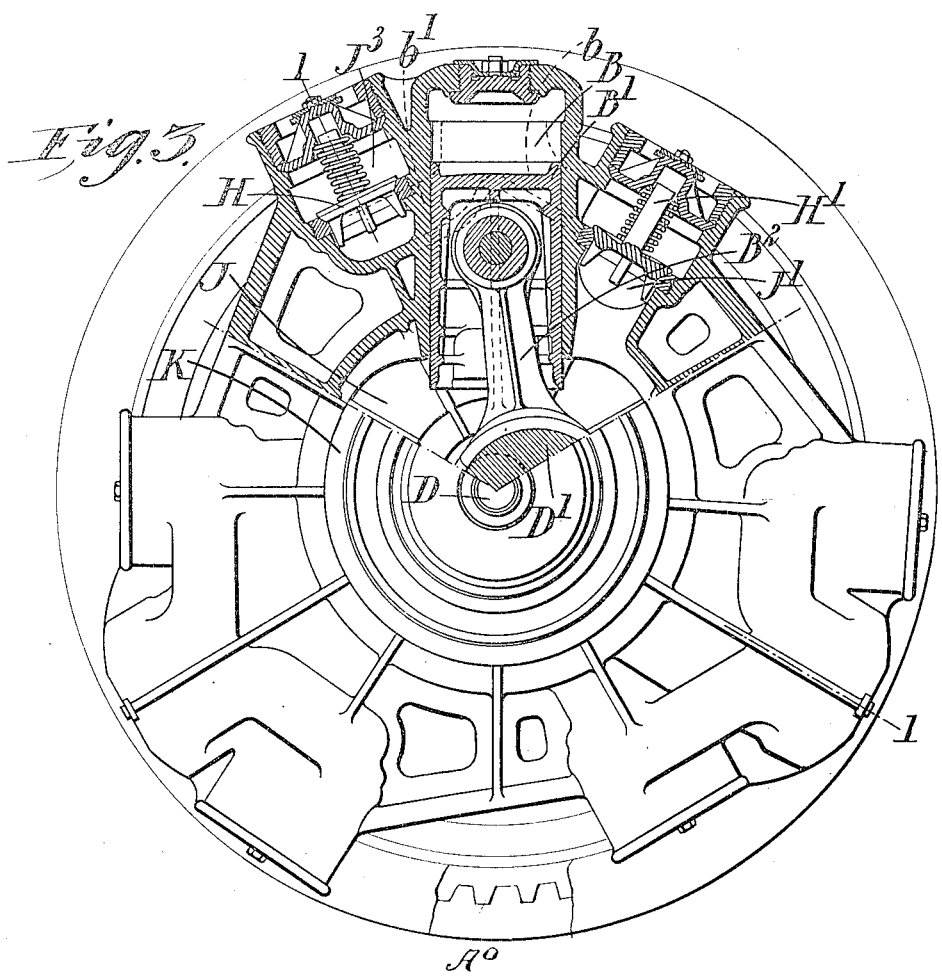
Witnesses:
John Enders
Chas. H. Buell
Inventor:
John William Hall,
By Dyrenforth, Dyrenforth & Lee
Attys

UNITED STATES PATENT OFFICE.

JOHN WILLIAM HALL, OF LONDON, ENGLAND, ASSIGNOR TO HALL'S TRANSMISSION GEAR SYNDICATE LIMITED, OF LONDON, ENGLAND.

FLUID-PRESSURE POWER-TRANSMISSION MECHANISM.

No. 852,384.   Specification of Letters Patent.   Patented April 30, 1907.

Application filed October 24, 1905. Serial No. 284,406.

*To all whom it may concern:*

Be it known that I, JOHN WILLIAM HALL, a subject of the King of England, and residing in London, England, have invented certain new and useful Improvements in or Relating to Fluid-Pressure Power-Transmission Mechanism, of which the following is a specification.

This invention relates to fluid pressure power transmission mechanism of the kind in which two cylinders or two sets of cylinders that conveniently may be of equal maximum capacity are employed and the variation of speed of the part to be driven is obtained by varying the receptive capacity of one cylinder or of the cylinders of one set. For this purpose the piston of this cylinder or the pistons of one set of cylinders are connected with a crank or eccentric so carried that its throw can be varied from maximum to zero in which latter position it operates as a stud or abutment and no movement is imparted to the piston or pistons with which it is connected.

The cylinders in both sets correspond in number and are all connected together to rotate in unison, being preferably carried by a rotary casing or body which may be either the driving or driven member. The cylinders of both sets communicate with each other through conduits controlled by valves, the movements of the valves being co-related with the movements of the pistons, and the strokes of the pistons of one set are varied to vary the receptive capacity of their cylinders. This type of transmission apparatus is exemplified in United States Letters Patent Nos. 626996 and 803584, both granted to J. W. Hall.

According to the embodiment of the invention hereinafter fully described, the casing or body carrying the cylinders is the driving member and the driven member or member from which the motion is taken is a shaft which extends into the casing through one of its ends and is supported at its inner end in an internal bearing within the casing. This shaft has a crank to which the pistons of the pump cylinders are connected by rods or otherwise.

As in the apparatus of aforesaid Letters Patent No. 803,584 a stationary eccentric is carried at the adjuster end of the device and upon it there is rotatably mounted a second eccentric; the rotation of this outer eccentric relatively to the stationary one on the shaft controls the receptive capacity of one set of cylinders by varying the stroke of the pistons therein and therefore controls the speed given it by the mechanism. The movements of this eccentric also control the operation of the valves of the adjuster cylinders. In addition to the valves of the adjuster cylinders thus controlled, the pump cylinders are fitted with suction and delivery valves or their equivalents.

Referring now to the accompanying drawings:—Figure 1 is a longitudinal section on the line 1—1 of Figs. 2 and 3; Fig. 2 is a transverse section through the speed adjuster end of the mechanism shown in Fig. 1, and Fig. 3 is a transverse view partly in section of the pump end of the mechanism.

According to this preferred embodiment of the invention, A is the rotary body or casing, A⁰ is a sprocket-wheel or chain-wheel fixed to it, by which it is rotated.

B are the pump cylinders of which there are three in the present example; C are the adjuster cylinders, the capacity of which can be varied, D is a rotary shaft which may be either the driving or the driven member and E a stationary support for a fixed eccentric $E^1$.

F is an adjustable eccentric controlling the stroke of the pistons in the adjuster cylinders.

G are the valves of the adjuster cylinders and H $H^1$ the pump valves.

The casing A is conveniently made in two halves or parts bolted or otherwise secured together. The pump cylinders B are made in one with one part of the casing and the adjuster cylinders C are formed as part of the other portion of the casing; the two sets of cylinders therefore rotate in one with the casing and with each other around the axis of rotation of the device which is also the axis of rotation of the shaft D. The pump and adjuster cylinders in the present example have the same maximum capacity. The pump cylinders are provided with pistons $B^1$ having connecting rods $B^2$ which are attached to a crank $D^1$ on the shaft D. The shaft D extends through a bearing in the end of the casing A and projects for a convenient distance into it, where its inner end is thus supported in stationary bearings on each side of its crank $D^1$. The sleeve $d$ is keyed to the inner end of the shaft $D$ and rotates in the bearing $a$. In line with the shaft $D$ there is mounted a fixed shaft $E$, which extends through the opposite end of the casing to the shaft $D$. This non-rotating shaft $E$ is carried in a bearing $a^1$ in the casing (which is similar to the outer bearing supporting the shaft $D$) and its inner end has keyed to it a sleeve $e$ which rotates within a bearing $a^2$ on the casing. Between its bearings $a^1$ and $a^2$ the shaft has an eccentric $E^1$ and encircling this eccentric is a rotatable eccentric $F$ to which are keyed rods $C^2$ of pistons $C^1$ which work in adjuster cylinders $C$.

$K$ $K^1$ are ball bearings which are carried by or connected to stationary supports and support the opposite ends of the casing which is free to rotate within these bearings.

The bearings $K$ $K^1$ on which the casing turns and the bearings $a$ on each side of the crank $D^1$ and the bearings $a^1$ $a^2$ on each side of the adjuster-crank-shaft $E^1$ are co-axial with one another. But the bearings $a$ $a^1$ $a^2$ of the shafts $D$ and $E$ are supported by the casing and are independent of the bearings $K$ $K^1$ on which the casing turns. By this arrangement all that the bearings $K$ $K^1$ have to do is to support the casing and keep it in place against such moderate tendency to move it sidewise as arises because of the resistance set up by the load to which the turning effort of the apparatus applies itself. The thrust upon the bearings $a$ $a^1$ $a^2$ is much greater than any which the bearings $K$ $K^1$ have to resist, inasmuch as it results from the direct action of the hydraulic pressure between the covers of the pump and adjuster cylinders and their pistons; but all this thrust acts within the limits of the casing and is not transmitted, as in former constructions, to the bearings by which the casing itself is supported.

For convenience in rotating the eccentric $F$ upon the eccentric $E^1$ a sleeve $F^1$ is mounted upon the shaft $E$ and its inner end $F^2$ forms one member of an Oldham coupling, the other parts $F^3$ of which are carried on the end of the eccentric $F$. At its outer end this sleeve carries a worm wheel $N$ with which a worm $O$ engages so that by rotating this worm in one way or the other, the throw of the eccentric can be varied from maximum to nothing and therefore the travel of the pistons in the cylinder $C$ varied to vary the receptive capacity of these cylinders. The same mechanism which controls the adjustment of the eccentric $F$ controls the operation of the valves $G$. These valves $G$ move in valve chambers $G^1$ provided with liners $G^2$ and the valves are in the form of sliding pistons having piston rods $G^3$, the outer ends of which are connected to cranks $P$ on shafts $P^1$. Mounted on the ends of these shafts $P^1$ are toothed wheels $Q$ which are in constant gear with a toothed ring $R$ which is rotatably mounted and carries planet pinions $S$ gearing with a stationary toothed ring $T$ and with a movable internally toothed ring $U$. This toothed ring $U$ has attached to it one member $V^1$ of an Oldham coupling $V$, the other part $V^2$ of which is carried by the eccentric $F$. By means of this gearing the cranks on the valve-operating shafts are caused to move through half the distance of the eccentric $F$ when the latter is adjusted, that is to say, for every half revolution of the eccentric $F$ with respect to the fixed shaft $E$, the valve-operating cranks are only turned through a quarter of a revolution.

In Fig. 1 the eccentric $F$ is at full throw and if when it is in this position, rotary motion is applied to the casing, no driving action will take place through the gear since the capacities of the cylinders $B$ and $C$ being equal the fluid drawn by the pumps from the crank chamber $J$ will be forced by them into the adjuster cylinders and from these back to the crank chamber and therefore beyond any slight turning effort due to friction no useful results will be obtained. When the eccentric $F$ is in an intermediate position, the receiving capacity of the speed adjuster cylinders $C$ will be more or less diminished in accordance with the position of this eccentric which moves the pistons $C^1$ to a greater or less extent into their cylinders $C$ and also moves the valves $G$ to correspond. When the cylinders $B$ and $C$ are of the same maximum capacities then all variations in speed between the driving and driven members can be obtained by simply varying the throw of the eccentric $F$ and therefore the travel of the pistons $C^1$ in the cylinders $C$.

Assuming the eccentric $F$ to be in an intermediate position and that rotary motion is applied to the casing, the stroke of the pistons $C^1$ will be reduced. The pump pistons will continue to draw into their cylinders fluid from the crank chamber or center $J$ of the casing until they are full. This fluid passes by a passage $J^1$ through the valve $H$ into a passage $b$ communicating with the end of the pump cylinder. On the return stroke of the pump pistons the fluid which cannot leak back into the crank chamber is forced from the pump cylinders by the passage $b^1$, through the valve $H^1$ by passages $J^3$ and $J^4$ into valve chamber $G^1$, the ports $g$ $g^1$ of which are controlled by the piston valve $G$. The chamber $G^1$ communicates by a passage $J^5$ with a passage $c$ at the inner end of the adjuster cylinder into which the fluid is now forced.

The chamber $J^4$ which extends right round the casing is in connection with the delivery ports of all the pumps and also with the valves of the adjuster cylinders; and acts as a high pressure accumulator chamber, allowing any one adjuster cylinder to receive fluid from any one pump. This is necessary owing to the constantly varying velocities of the pump and adjuster pistons.

The pumps constantly draw in and try to deliver at each stroke to the adjuster cylinders the same quantity of fluid but this fluid which when the eccentric F was at full stroke and the maximum capacity of the adjuster cylinders was available to receive it, cannot now all enter these cylinders. As the power applied to the casing is continued the fluid which must be accommodated somewhere between the two series of cylinders sets up a pressure in the pump cylinders and also in the adjuster cylinders and since it cannot all enter the adjuster cylinders it reacts upon the pump pistons and the pump connecting rods are caused to exert their power upon the crank $D^1$ on the shaft D which forming an abutment by which the pump pistons are operated gives way and is turned round at a speed less than the speed of rotation of the casing. In the continued rotation of the casing the valves G are operated to permit the fluid to return to the crank chamber. Each further rotation of the eccentric F upon the eccentric $F^1$ and the further entry of the pistons $C^1$ into their respective cylinders C with the consequent reduction of their receptive capacity, causes the shaft D to rotate at a higher rate of speed and so on with each successive reduction in the receptive capacity of the cylinders C. When the eccentric F is at its innermost position the receptive capacity of the cylinders C ceases and as the pump cylinders cannot deliver the fluid to these cylinders and the fluid itself is incompressible the rotative effort of the casing is transmitted to the crank $D^1$ through the pump pistons and their connecting rods and the shaft D and casing A rotate as one piece.

It should be observed that the pump-cylinders B and pump-valve chests $J^3$ radiate from the axis of rotation of the casing, with their center lines all in one plane. The same arrangement holds for the adjuster-cylinders C and their valve-chambers $G^1$. This construction facilitates the manufacture of the apparatus as to both the casting and the subsequent machining requisite.

What I claim as my invention and desire to secure by Letters Patent is:—

1. In a power-transmitting apparatus, the combination with a rotary pump-casing, a pump-cylinder fixed to it, a rotary adjuster-casing in operative connection with the pump-casing, and an adjuster-cylinder fixed to the adjuster-casing, of bearings co-axial with one another on which the pump-casing and adjuster-casing turn, a pump crank-shaft and an adjuster-crank-shaft, and bearings that support both of said shafts, supported by said casings and co-axial with but independent of the aforesaid bearings on which the casings turn.

2. In a power-transmitting apparatus, the combination with a rotary pump-casing, a pump-cylinder fixed to it, a rotary-adjuster-casing in operative connection with the pump-casing, and an adjuster-cylinder fixed to the adjuster-casing, of bearings co-axial with one another on which the pump-casing and adjuster-casing turn, a pump crank-shaft and an adjuster crank-shaft, and a plurality of bearings that support both of said shafts at both sides of each crank supported by said casings and co-axial with but independent of the aforesaid bearings on which the casings turn.

3. In a power-transmitting apparatus, the combination with a rotary pump-casing, a pump-cylinder fixed to it, a rotary adjuster-casing in operative connection with the pump-casing, and an adjuster-cylinder fixed to the adjuster-casing, of bearings co-axial with one another on which the pump-casing and adjuster-casing turn, a pump-crank-shaft and an adjuster crank-shaft, bearings that support both of said shafts supported by said casings and co-axial with, but independent of, the aforesaid bearings on which the casings turn, a sleeve $F^1$ encircling the adjuster crank-shaft between it and its bearing in the casing and rotatably adjustable with relation to said shaft, an eccentric upon the adjuster crank-pin, and a coupling constituting an operative connection between the sleeve and the eccentric.

4. In a power-transmitting apparatus, the combination with a rotary pump-casing, a pump-cylinder fixed to it, a rotary adjuster-casing in operative connection with the pump-casing, and an adjuster-cylinder fixed to the adjuster-casing, of bearings co-axial with one another upon which the pump-casing and adjuster-casing turn, a pump crank-shaft and an adjuster crank-shaft, bearings for the pump crank-shaft and adjuster crank-shaft, and an eccentric encircling the crank-pin on the adjuster crank-shaft, means whereby that eccentric is rotatably adjustable round the crank-pin, a valve-operating crank-shaft ($P^1$) mounted in bearings in one of the rotary casings, a gear-ring (U) rotatable in relation to the adjuster crank-shaft and concentric therewith, and operatively connected to the eccentric, a gear-ring T, smaller than the aforesaid gear-ring, concentric with the adjuster crank-shaft and fixed to it so as not to be rotatable in relation thereto, gear-wheels (S) meshing with both of the gear rings, a rotatable toothed annulus (R) encircling the adjuster crank-shaft, capable of rotation in relation to that shaft and having upon it pivots which carry the said gear-wheels, and a positive operative connection between the valve-operating crank-shaft and the toothed annulus.

5. In a power-transmitting apparatus, the combination of a rotary pump-casing, a pump cylinder fixed to it, a rotary adjuster-casing in operative connection with the pump-casing, an adjuster cylinder fixed to the adjuster casing, bearings co-axial with one another upon which the pump-casing and adjuster-casing turn, a pump crank-shaft and an adjuster crank-shaft, bearings that support both of said shafts supported by said casings and co-axial with, but independent of, the aforesaid bearings on which the casings turn, a pump valve-chamber in the plane in which the pump-cylinder moves, and an adjuster valve-chamber in the plane in which the adjuster-cylinder moves.

6. In a power transmitting mechanism the combination with a rotary casing, a fluid-pressure-creating device such as a pump having two co-operative elements one of which is operatively connected with the casing and a fluid pressure power and speed adjuster of the same maximum capacity as the pump, having two co-operating elements one of which is connected with the casing, and a valve controlling the distribution of motive fluid, of a shaft projecting through the pump end of the device, a crank on the shaft, a connection between the second pump element and the crank, a fixed eccentric, a rotatable eccentric surrounding said fixed eccentric, a connection between the second element of the power and speed adjuster and the rotatable eccentric and sun and planet gearing between the controlling valve and the adjustable eccentric.

7. In a power transmitting mechanism the combination with a rotary casing, a fluid-pressure-creating device such as a pump having two co-operating elements one of which is operatively connected with the casing, and a fluid-pressure power and speed adjuster having two co-operating elements one of which is connected with the casing, and a valve controlling the distribution of motive fluid through the adjuster cylinder, of a shaft, a crank on the shaft, a connection between the crank and the pump piston, a fixed eccentric, an adjustable eccentric surrounding said fixed eccentric, a connection between the second element of the power and speed adjuster and said movable eccentric and sun and planet gearing between the controlling valve and the said movable eccentric.

8. In a power transmitting mechanism the combination with a rotary casing, a fluid pressure-creating device such as a pump having two co-operating elements, one element of which is operatively connected with the casing, a fluid pressure power and speed adjuster of the same maximum capacity as the pump and having two co-operative elements, one of which is connected with the casing, and a valve controlling the distribution of motive fluid to the adjuster cylinder, of a shaft, a crank on the shaft, bearings for the shaft on each side of the crank, a connection between the crank and the second element of the pump, a stationary eccentric, a stationary support to which the eccentric is fixed, a movable eccentric surrounding the stationary eccentric, a connection between the second element of the adjuster and the movable eccentric, planet gearing for operating the controlling valve, and operative connection between the movable eccentric and the planet gearing.

9. In a power transmitting mechanism the combination with a rotary casing a fluid-pressure-creating device such as a pump having two co-operative elements one of which is operatively connected with the casing, a fluid pressure power and speed adjuster having two co-operative elements one of which is connected with the casing, and a valve controlling the distribution of motive fluid to an adjuster cylinder, of a shaft, a crank on the shaft, bearings for the shaft on each side of the crank, a connection between the crank and the second element of the pump, a stationary eccentric, a stationary support to which the eccentric is fixed, a movable eccentric surrounding the stationary eccentric, a connection between the movable eccentric and the second element of the adjuster, an eccentric connected with the controlling valve, and planet gear between the valve eccentric and the aforesaid movable eccentric.

10. In a power-transmitting mechanism the combination with a rotary casing, a fluid-pressure-creating device such as a pump having two co-operative elements one of which is operatively connected with the shaft, a fluid-pressure power and speed adjuster of the same maximum capacity as the pump having two co-operative elements one of which is connected with the casing, and a valve controlling the distribution of motive fluid to an adjuster cylinder, of a rotary shaft projecting through the pump end of the device a crank on the shaft, bearings for the shaft on each side of the crank, a stationary shaft in line with the rotary shaft, an eccentric fixed to the stationary shaft, and adjustable eccentric surrounding the fixed eccentric, a connection between the movable eccentric and the second element of the power and speed adjuster, a movable sleeve, a flexible connection between the sleeve and the movable eccentric, a movable eccentric connected with the controlling valve, planet gearing connected with this eccentric, a flexible connection between the planet gearing and the eccentric operating the adjuster.

11. In a power transmitting device the combination with a rotary casing, a pump cylinder, an adjuster cylinder having the same capacity as the pump cylinder, a valve for controlling the passage of fluid to and from the cylinders and the center of the casing, of a shaft, a crank on the shaft, a connection between the pump piston and the crank, a fixed eccentric, a movable eccentric surrounding the fixed eccentric, a connection between the movable eccentric and the adjuster piston, a rotatable sleeve, a flexible connection between the rotatable sleeve and the movable eccentric, a movable eccentric, a connection between this eccentric and the controlling valve, planet gearing connected with this eccentric and an operative connection between the planet gearing and the adjuster-controlling eccentric.

12. In a power-transmitting mechanism the combination with a rotary casing, a cylinder connected to the casing, a pump piston in the cylinder, a fluid pressure power and speed adjuster cylinder having the same maximum capacity as the pump cylinder and connected with the casing, a piston in the adjuster cylinder, a valve controlling the distribution of motive fluid to the adjuster cylinder, a rotary shaft projecting through one end of the device, a crank on the shaft, bearings for the shaft on each side of the crank, of a fixed eccentric, an adjustable eccentric surrounding the fixed eccentric, a connection between the adjuster piston and the adjustable eccentric, a rotatable sleeve, a flexible connection between the sleeve and the adjustable eccentric, a rotatable internally toothed ring, a flexible connection between the adjustable eccentric and the ring, a rotatable plate, a planet pinion carried by the plate and gearing with the teeth of the ring, a fixed toothed ring gearing with the planet pinion, a pinion on the rotatable plate, a shaft, a pinion fixed to the shaft, an eccentric on the shaft connected with the controlling valve, and a pinion on the shaft gearing with the central pinion on the plate.

13. In a power-transmitting mechanism the combination with a rotary casing, a pump cylinder connected to the casing, a piston in the cylinder, a fluid-pressure power and speed adjuster cylinder connected with the casing, a piston in the adjuster cylinder, a valve controlling the distribution of motive fluid to the adjuster cylinder, of a rotary shaft, a crank on the shaft, a connection between the crank and the pump piston, a fixed eccentric, an adjustable eccentric surrounding the fixed eccentric, a connection between the adjuster piston and the adjustable eccentric, a rotatable sleeve, a flexible connection between the sleeve and the adjustable eccentric, a rotatable internally toothed ring, a flexible connection between the ring and the adjustable eccentric, a rotatable plate, a planet pinion on the plate and gearing with the teeth of the ring, a fixed toothed ring gearing with the planet pinion, a central pinion on the rotatable plate, a shaft, an eccentric on the shaft connected with the controlling valve, and a pinion on the shaft gearing with the central pinion on the plate.

14. In a power-transmitting mechanism, the combination with a rotary casing, a pump cylinder connected with the casing, a piston in the pump cylinder a fluid-pressure power and speed adjuster cylinder carried by the casing and having the same maximum capacity as the pump cylinder, a piston in the adjuster cylinder, a valve controlling the distribution of motive fluid to the adjuster cylinder, of a rotary shaft in coincident axial alinement with the casing, and projecting through the pump end of the device, a crank on the shaft, bearings on the casing for the shaft, at each side of the crank, a connection between the crank and the pump piston, a stationary shaft in alinement with the rotary shaft, a fixed eccentric on the shaft, bearings in the casing for the shaft on each side of the fixed eccentric, a rotatable eccentric surrounding the fixed eccentric, a connecting rod making pivotal engagement by one of its ends with the rotatable eccentric and by its other end with the adjuster piston. a sleeve surrounding said fixed shaft, a flexible connection between the rotatable eccentric and the sleeve, an internally toothed ring loose on the stationary shaft, a flexible connection between the toothed ring and the rotatable eccentric, a toothed pinion fast on the stationary shaft, a rotary disk, a planet pinion on the disk meshing with the internally toothed ring and the stationary pinion, a pinion on the disk, a pinion gearing with the disk pinion, a shaft carried in the casing for the pinion, an eccentric on the shaft, and a connection between the controlling-valve piston and the eccentric substantially as described.

15. In a power transmitting mechanism the combination with a rotary casing, a pump cylinder connected with the casing, a piston in the cylinder, a fluid-pressure power and speed adjuster cylinder connected with the casing, a piston in the cylinder, a valve controlling the distribution of motive fluid to an adjuster cylinder, of a shaft, a crank on the shaft, a connection between the crank and the pump piston, bearings carried by the casing for the shaft at each side of the crank, a stationary shaft in alinement with the rotary shaft, an eccentric fixed on the stationary shaft, bearings in the casing for the shaft on each side of the eccentric, a rotatable eccentric surrounding the stationary eccentric, a connecting rod making pivotal engagement by one of its ends with the rotatable eccentric and by its other end with the adjuster piston a hollow shaft extending through the adjuster end of the device, a flexible connection between the hollow shaft and the rotatable eccentric, means for rotating the hollow shaft, an internally toothed ring loose on the stationary shaft, a flexible connection between the toothed ring and the rotatable eccentric, a toothed pinion fast on the stationary shaft, a rotary disk, a planet pinion on the disk meshing with the internally toothed ring and the stationary pinion, a pinion on the disk, a pinion gearing with the disk pinion, a shaft carrying the pinion, an eccentric on the shaft, and a connection between the controlling-valve piston and the eccentric.

In testimony whereof I have signed my name to this specification in the presence of two subscribing witnesses.

JOHN WILLIAM HALL.

Witnesses:
HAROLD WADE,
HARRY D. BRADY.